US006739127B2

(12) United States Patent
Nippert et al.

(10) Patent No.: US 6,739,127 B2
(45) Date of Patent: May 25, 2004

(54) HYDRAULIC SYSTEM PUMP CHARGING AND RECIRCULATION APPARATUS

(75) Inventors: Andrew H. Nippert, Peoria, IL (US); Kevin J. Graf, Chillicothe, IL (US)

(73) Assignee: Caterpillar Inc, Peoria, IL (US)

( * ) Notice: Subject to any disclaimer, the term of this patent is extended or adjusted under 35 U.S.C. 154(b) by 32 days.

(21) Appl. No.: 10/164,015

(22) Filed: Jun. 7, 2002

(65) Prior Publication Data

US 2003/0226354 A1 Dec. 11, 2003

(51) Int. Cl.[7] .................. F16D 31/02
(52) U.S. Cl. .................. 60/414; 60/488; 60/464
(58) Field of Search .................. 60/413, 414, 464, 60/468, 488, 494

(56) References Cited

U.S. PATENT DOCUMENTS 4,026,107 A * 5/1977 Kosek et al. ................. 60/413
4,098,083 A * 7/1978 Carman ................. 60/414
4,769,989 A * 9/1988 Ostwald et al. ................. 60/414
4,813,234 A * 3/1989 Nikolaus ................. 60/484
5,579,868 A * 12/1996 Pelto-Huikko ................. 60/414
6,363,719 B2 * 4/2002 Mohr et al. ................. 60/414

* cited by examiner

*Primary Examiner*—Thomas E. Lazo
(74) *Attorney, Agent, or Firm*—Finnegan, Henderson, Farabow, Garrett & Dunner

(57) ABSTRACT

An apparatus for charging a hydraulic system from a fluid reservoir includes a pump having an inlet and an outlet, a first conduit fluidly connected to the pump inlet and fluidly connectable to the fluid reservoir, and a second conduit fluidly connected to the pump outlet and fluidly connectable to the system. The apparatus also includes an accumulator operatively connected to the second conduit, a third conduit interconnecting the first conduit and the second conduit, and an electrically actuated fill valve operatively disposed in the third conduit.

20 Claims, 6 Drawing Sheets

HYDRAULIC SYSTEM PUMP CHARGING AND RECIRCULATION APPARATUS

TECHNICAL FIELD

This invention relates generally to hydraulic systems and, more particularly, to systems for charging and re-circulating hydraulic fluid between hydraulic systems and hydraulic fluid reservoirs.

BACKGROUND

Today's earthmoving and agricultural machine hydraulic systems generally use a non-pressurized tank as a reservoir for the hydraulic working fluid to be supplied to a drive pump. For hydrostatic drive hydraulic systems, a charge pump typically is required to charge the drive pump inlet at generally in the 0.7–2.1 MPa (~100–300 psi) range. This prevents pump cavitation, but also results in power lost due to having to throttle this flow back to the non-pressurized tank across a relief valve. Typically, the charge pump flow represents about 15% of the rated flow of the hydrostatic drive pump.

In the case of implement hydraulic systems, the implement pump is generally designed such that it does not require that its inlet be charged. However, pump rotation speed often must be limited to prevent inlet cavitation. This also puts limitations on tank placement in relation to the pump suction inlet.

Cylinder voiding is another problem frequently encountered using atmospheric drain pressure in conventional implement hydraulic systems. While makeup check valves can be used, large makeup flows are difficult to accomplish with only atmospheric pressure. Installing a charge pump for an implement system generally is not practical, since it would require a large pump (hence more power loss) to effectively deal with the large flows associated with activation/deactivation of implements with large cylinder capacity, such as booms, etc. However, one oft-used solution is the installation of a spring-loaded check valve in the drain line in an attempt to control the drain or recirculation of hydraulic fluid back to the reservoir/tank. Not only does this conventional solution waste power, but it is not effective in all circumstances.

Moreover, most machines having hydrostatic drives have used separate pumps and other fluid control components for the implement and hydrostatic drive hydraulic systems. This is because of the differing requirements of the implement and hydrostatic drive systems respectively. For example, hydrostatic drive hydraulic systems typically require "over-center" pump operation and a "motorable" pump capability, while implement hydraulic systems do not. However, while hydrostatic systems typically need not accommodate large working fluid volume changes, implement systems routinely encounter such changes, as mentioned previously.

The present invention is directed to apparatus and methods that can optionally diminish one or more of the problems or disadvantages associated with the prior art.

SUMMARY OF THE INVENTION

In one aspect of the present invention, an apparatus is provided for charging a hydraulic system from a fluid reservoir. The apparatus includes a pump having an inlet and an outlet, a first conduit fluidly connected to the pump inlet and configured to be fluidly connected to the fluid reservoir, and a second conduit fluidly connected to the pump outlet and configured to be fluidly connected to the system. The apparatus also includes an accumulator operatively connected to the second conduit, a third conduit interconnecting the first conduit and the second conduit, and an electrically actuated fill valve operatively disposed in said third conduit.

In another aspect of the present invention, an apparatus is provided for charging and recirculating fluid between a hydraulic system and a reservoir. The apparatus includes a supply conduit having a system end connectable to the system and a reservoir end connectable to the reservoir, a pump operatively disposed in the supply conduit between the system and reservoir ends, a check valve operatively disposed in the supply conduit between the pump and the reservoir end to prohibit return flow to the reservoir, and an accumulator fluidly connected to the supply conduit between the pump and the system end. The apparatus also includes a first bypass circuit including a first bypass conduit having respective ends fluidly connected to the supply conduit at a location between the pump and the supply system end and at a location between the pump and the check valve, and including a first electrically actuated valve operatively disposed in the first bypass conduit. The apparatus further includes a second bypass circuit including a second bypass conduit having respective ends fluidly connected to the supply conduit at a location between the pump and the system end and at a location between the check valve and the reservoir end, and including a second electrically actuated valve operatively disposed in the second bypass conduit.

Yet another aspect of the present invention includes a method for charging and recirculating fluid between a hydraulic system and a fluid reservoir. The method includes providing a system charging circuit including a pump with an inlet connected to the reservoir and an outlet connected to the system, and also an accumulator operatively connected to the pump outlet, the accumulator having a fluid working capacity. The pump is activated to increase fluid pressure at the pump outlet and charge fluid to the system. Fluid is selectively fed back from the circuit to the pump inlet when a pressure in the accumulator exceeds a first predetermined value. Fluid is selectively fed back from the charging circuit to the reservoir when the pressure in the accumulator exceeds a second predetermined value.

DETAILED DESCRIPTION

Figure 1:
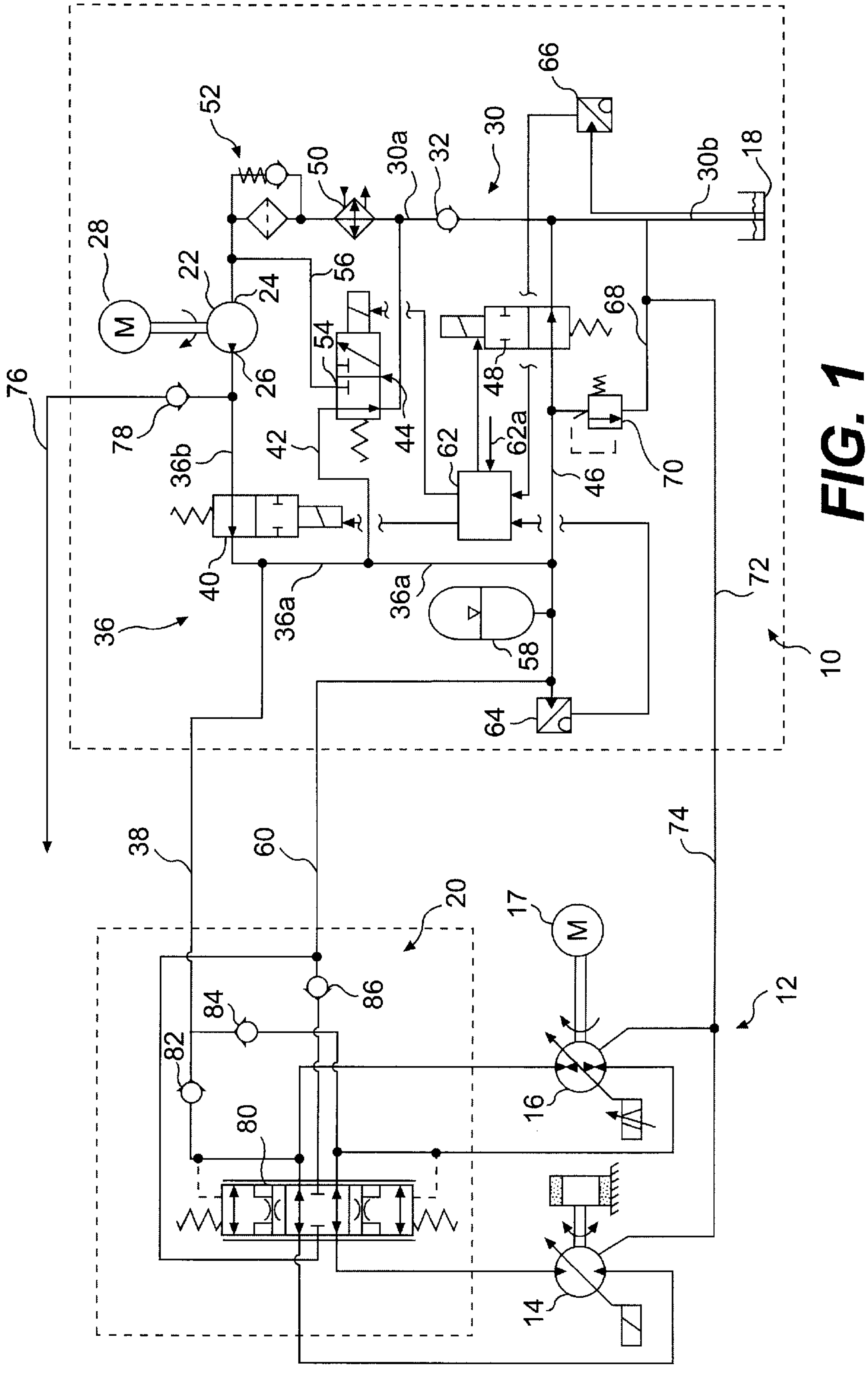
FIG. 1 is a schematic representation of a first exemplary embodiment of a pump charging and recirculation control apparatus shown in use with a hydrostatic drive system.

With initial reference to FIG. 1, an exemplary hydraulic system charging apparatus generally designated by the numeral 10 is depicted in use for charging hydraulic system 12, which includes hydraulic drive motor 14 and drive pump 16, from tank reservoir 18. Also depicted in FIG. 1 is hydraulic resolver circuit apparatus 20, to be discussed in more detail henceforth, that operatively interconnects charging apparatus 10 with hydraulic system 12 for charging fluid from tank reservoir 18.

One skilled in the art would understand from the FIG. 1 schematic that drive pump 16 which is driven by a prime mover such as motor 17 provides the flow of pressurized hydraulic fluid for operation of drive motor 14, which is depicted as being operable in both angular directions as controlled by resolver circuit 20. As will be explained in more detail hereinafter, apparatus 10 provides a charging pressure sufficient to prevent cavitation of pump 16, which pressure may depend upon the particular pump apparatus employed and operating conditions such as pump speed. In one exemplary embodiment, this pressure may be on the order of 0.7 to 2.1 MPa (~100 to 300 psi). Apparatus made in accordance with the present invention, such as charging apparatus 10, may also provide for energy efficient recirculation of excess hydraulic fluid from hydraulic system 12 to tank reservoir 18 during selective outages of one or more hydraulic system components.

As embodied in FIG. 1, apparatus 10 includes pump 22 having inlet 24 and outlet 26. Pump 22 is driven by motor 28, which can desirably be an electric motor or an internal combustion engine, such as when apparatus 10 is configured as a self-contained unit module (shown by dotted line). Such a modular configuration could be used to charge hydraulic systems different from that shown in FIG. 1, such as, for example, the hydraulic systems shown in FIGS. 2–6. Although tank reservoir 18 is depicted in FIG. 1 as part of a modular assembly together with apparatus 10, charging apparatus 10 need not include tank reservoir 18 but can be utilized with other fluid reservoirs, as one skilled in the art would readily understand.

Apparatus 10 includes supply conduit 30 interconnecting pump inlet 24 and fluid tank reservoir 18. Preferably, check valve 32 is operatively disposed in conduit 30 to prevent return flow to reservoir tank 18 from portion 30*a* of conduit 30 between check valve 32 and pump 22. For reasons that will become more apparent from the succeeding discussion, check valve 32 helps provide a greater margin to cavitation of pump 22, particularly for high hydraulic system charging pressures. Check valve 32 also provides energy efficient fluid conditioning of the hydraulic fluid using pump 22 for fluid circulation through conduit portion 30*a* as will be discussed henceforth.

Apparatus 10 includes supply conduit 36 interconnected between pump outlet 26 and hydraulic system 12. In the FIG. 1 embodiment, supply conduit 36 having portions 36*a* and 36*b* is shown connected to hydraulic system inlet 38 of resolver circuit 20 which can be part of a modular assembly configuration of apparatus 10 or a separate, interchangeable module. As shown in FIG. 1, embodiments may include an electrically actuated charge valve 40 connecting 36*a* and 36*b* conduit portions in order to allow charging pump 22 to periodically charge a supplemental hydraulic system, such as a pilot or brake system with an associated accumulator, to a higher pressure than system charging pressure, such as, for example through conduit 76. With continued reference to FIG. 1, conduit 76 with associated check valve 78 are shown interconnected with conduit portion 36*b* between the pump outlet 26 and the charge valve 40. Again, other connections of conduit 76 to the high pressure charging side of apparatus 10 are possible in order that charging capacity of pump 22 can be fully utilized, particularly if the charging apparatus is configured as a module.

In the exemplary embodiment, conduit 42 is provided which interconnects conduit portion 36*a* downstream of charge valve 40 with portion 30*a* of supply conduit 30. Also, a fill valve such as electrically actuated fill valve 44 is operatively disposed in conduit 42. As one skilled in the art would appreciate, conduit 42 provides, in effect, a fluid path bypassing pump 22 that allows hydraulic fluid to be re-circulated in a loop from pump outlet 26 to pump inlet 24 through, sequentially, conduit portion 36*b*, the part of conduit portion 36*a* upstream of the interconnection with conduit 42, then conduit 42, and then conduit portion 30*a* whenever a predetermined charging pressure in supply conduit portion 36*a* is achieved. The location of the interconnection of conduit 42 with conduit portion 36*a* in FIG. 1 is purposefully downstream of the connection of hydraulic system inlet 38 to supply conduit portion 36*a* in order to insure that at least a portion of the hydraulic fluid supplied to hydraulic system 12 is conditioned fluid, as will now be discussed.

As depicted schematically in FIG. 1, one or more fluid conditioning components, such as heat exchanger 50 and filter unit 52, which can include a filter bypass as depicted, can be operatively disposed in conduit portion 30*a* downstream of the interconnection with bypass conduit 42. In such a configuration, hydraulic fluid circulated from conduit portion 36*a* back to pump inlet 24 can be conditioned to regulate temperature and/or remove impurities in an energy efficient manner. This is due to the pressure in conduit portion 30*a* being substantially above that in conduit portion 30*b*, which can be substantially at tank reservoir pressure (approximately atmospheric pressure).

As also depicted in FIG. 1, electrically actuated fill valve 44 can optionally include a selectable alternative outlet 54, and conduit 56 can be provided interconnecting alternate outlet 54 and pump inlet 24 by passing the fluid conditioning components, namely heat exchanger 50 and filter unit 52. As one skilled in the art would appreciate, fill valve 44 could be activated to selectively bypass the fluid conditioning components via outlet 54 and conduit 56 if continuous fluid conditioning of the recirculating fluid is not required. Although not shown, it may alternatively be preferred to dispose one or more of the conditioning components in other locations in the part of supply conduit portion 36*a*, such as between charge valve 40 and the interconnection with hydraulic system inlet 38, to provide continuous conditioning of all fluid charged to the system through pump 22. This alternative configuration would allow use of a 2-way valve 44 instead of the 3-way valve depicted in FIG. 1.

Charging apparatus 10 as depicted in FIG. 1 also includes empty conduit 46 is provided which interconnects hydraulic system return 60 to portion 30*b* of supply conduit 30 upstream of check valve 32. Also, an empty valve, such as electrically actuated empty valve 48, is operatively disposed in empty conduit 46 to return fluid to reservoir 18 to accommodate substantial reductions in the active operating fluid volume in hydraulic system 12, such as during the selective removal of certain implements and/or functions from the system.

Charging apparatus 10 includes a pressure accumulator, such as accumulator 58 in the FIG. 1 exemplary embodiment, operatively connected to the charging pressure side of the charging apparatus, that is, upstream of fill valve 44 and empty valve 48. In the FIG. 1 embodiment, accumulator 58 is fluidly connected to conduit portion 36*a* via the connection with empty conduit 46 which serves as the return path of hydraulic fluid to tank reservoir 18. One skilled in the art would realize that other connections to the pressurized side of the charging apparatus are possible, some of which will be discussed in relation to the embodiments in FIGS. 2–6. Accumulator 58 can be appropriately sized, such as, for example, a working pressure range of 0.7–2.1 MPa (~100–300 psi) to provide a reservoir for hydraulic fluid at the charging pressure during changes in working volume or capacity of the hydraulic system 12. That is, before activation of empty valve 48 is required, excess hydraulic fluid from hydraulic system 12 can flow via hydraulic system return 60 to accumulator 58 without experiencing a loss of energy corresponding to the volume of pressurized fluid that would otherwise be returned, i.e., "throttled," to tank reservoir 18 which is at a lower pressure (e.g. approximately atmospheric pressure).

A controller may be included in the charging apparatus. As depicted in the FIG. 1 embodiment, controller 62 is operatively connected to electrically actuated fill valve 44 and empty valve 48 of apparatus 10. As depicted in FIG. 1, controller 62 which can be a microprocessor and could be included in a modular configuration of apparatus 10 can, in turn, receive via input 62*a* a predetermined desired charging pressure to activate fill valve 44 (and also optional charge valve 40). Controller 62 can also receive input from pressure sensor 64 operatively connected to the charging pressure side of apparatus 10, in order to activate empty valve 48 whenever the volume of hydraulic fluid return from hydraulic system 12 via hydraulic system return 60 may exceed the working capacity of accumulator 58 as evidenced by a pressure rise in accumulator 58 above a preset value. Controller 62 also may receive other operator input instructions via input 62*a*, as well as hydraulic fluid level information directly from tank reservoir 18 such as from sensor 66. Monitoring fluid level in tank reservoir 18 can prevent operation of charging apparatus 10 with insufficient charging fluid and also signal abnormally high levels.

Still further, and as depicted in FIG. 1, a conduit such as conduit 68 may be provided interconnecting conduit 46 upstream of empty valve 48 and low pressure relief value 70 and fluidly communicating with the tank reservoir 18 to provide an emergency relief path for excess hydraulic fluid from the system. In the FIG. 1 embodiment, conduit 68 is connected to conduit portion 30*b* but one skilled in the art would realize that other connections are possible, including terminating conduit 68 directly in tank reservoir 18. Also, as shown in FIG. 1, a further conduit, such as conduit 72, is provided to interconnect with hydraulic system case drain 74 and provide a flow path to tank reservoir 18 via conduit 68 and conduit portion 30*b*. Again, those skilled in the art would realize that other interconnections to tank reservoir 18 are possible, some of which will be discussed in relation to FIGS. 2–6. The choice of interconnections may be governed by such considerations as whether the apparatus, such as apparatus 10, would be configured as a charging module that does not include a hydraulic fluid reservoir such as reservoir tank 18 and thus desirably may include only a single external connection for an external tank reservoir.

It may be practical to include the resolver apparatus in a module that includes the charging apparatus, such as a module having resolver circuit apparatus 20 and apparatus 10 depicted in FIG. 1, particularly if the hydraulic system included both hydrostatic drive and implement systems. As depicted in FIG. 1, resolver circuit apparatus 20 includes a resolver valve 80 and check valves 82, 84, and 86 operatively interconnecting drive motor 14 and pump 16 and interconnecting to apparatus 10 via hydraulic system inlet 38 and hydraulic system return 60.

Figure 2:
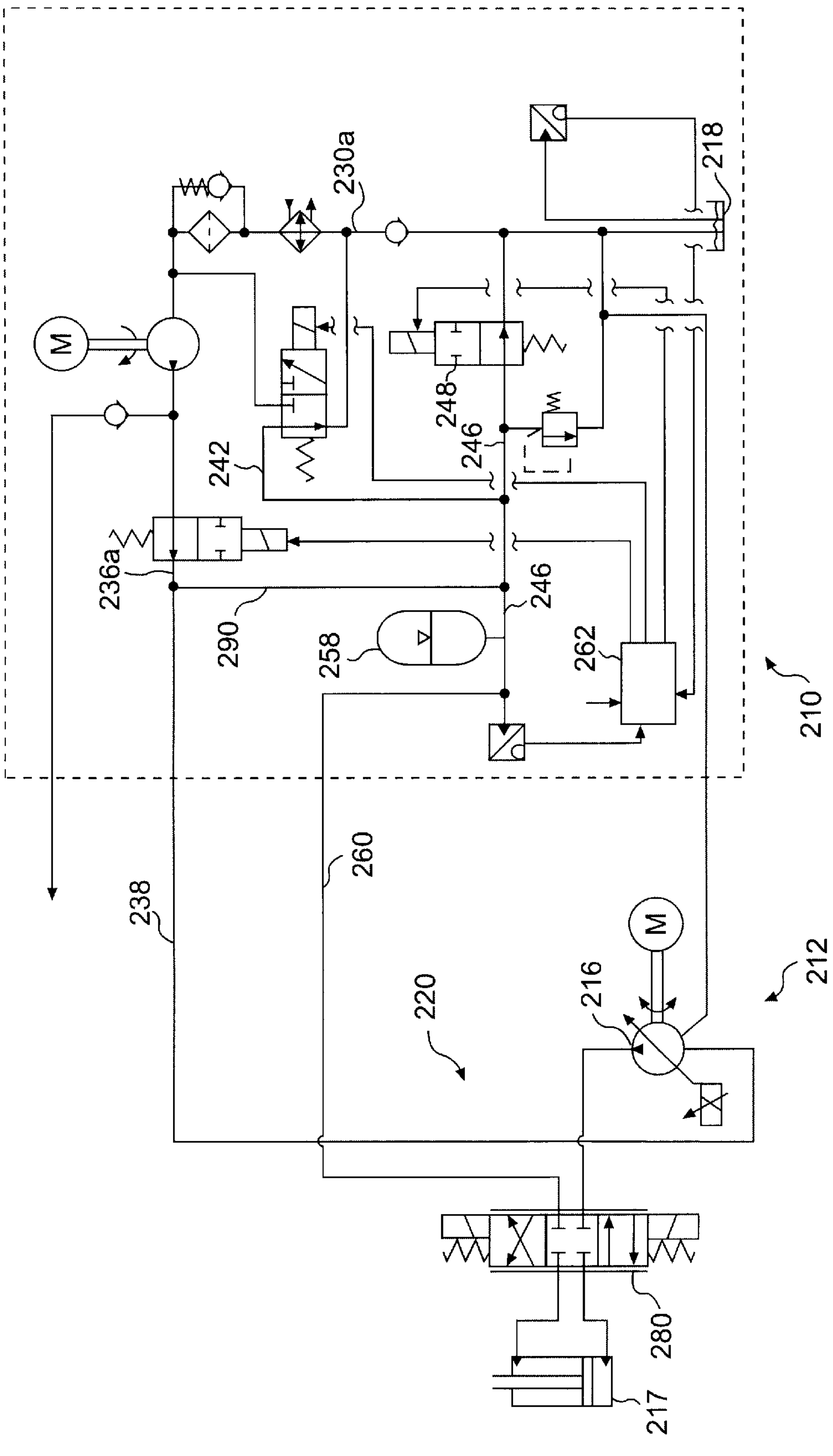
FIG. 2 is a schematic representation of a second exemplary embodiment of a pump charging and recirculation control apparatus shown in use with an implement drive system.

With reference now to FIG. 2, there is schematically depicted a variation on the charging apparatus previously discussed with reference to FIG. 1. Components in FIG. 2 with like or similar functions compared to the FIG. 1 embodiment are given the same reference number, but with a "200 base." However, the degree of similarity may vary.

In the FIG. 2 embodiment charging apparatus generally designated by the numeral 210 includes accumulator 258 directly connected to empty conduit 246, which is controlled by empty valve 248 and provides the main path for recirculating excess hydraulic system fluid from system return 260 to tank reservoir 218. However, shunt 290 is provided between charging/supply conduit portion 236*a* and empty conduit 246 to provide recirculation of hydraulic fluid at charging pressure from the pressure accumulator 258 directly back to hydraulic system 212. Furthermore, bypass conduit 242 is interconnected between supply conduit portion 236*a* and conduit portion 230*a* via shunt 290 and empty line 246. As compared to the FIG. 1 configuration, bypass conduit 242 is effectively connected to supply conduit 236*a* at the same location as the connection of conduit 236*a* to the system inlet 238. It is believed that the FIG. 2 configuration nonetheless will ensure that at least a portion of the fluid supplied to system 212 through system inlet 238 will be conditioned fluid.

Charging apparatus 210 is shown in use with hydraulic system 212 which is an implement drive system. Specifically, system 212 includes pump 216, fed from system inlet 338, and implement 217 controlled by resolver circuit 220, which includes valve 280. However, apparatus 210 could also be used with hydraulic system 12 depicted in FIG. 1 or with the systems disclosed in the succeeding embodiments, as one skilled in the art would readily understand.

Figure 3:
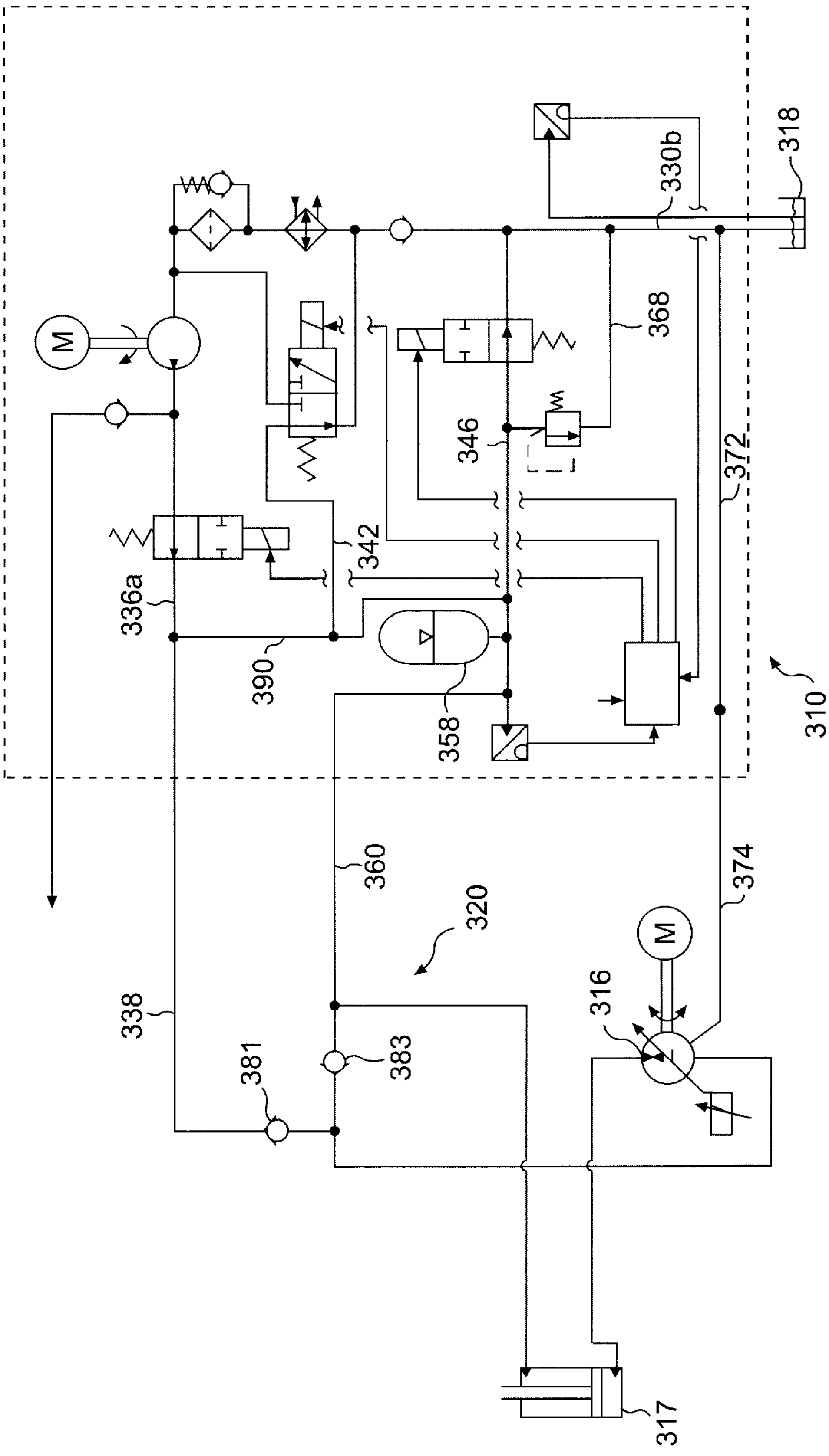
FIG. 3 is a representation schematic of a third exemplary embodiment of a pump charging and recirculation control apparatus shown in use with another implement drive system.

With reference now to FIG. 3, a further exemplary embodiment of a charging apparatus is disclosed. Again, similar components are given the same reference number as the FIG. 1 embodiment, but with a "300" base. The charging apparatus 310 depicted in FIG. 3 is similar to that shown in FIG. 2, but with bypass conduit 342 connected to shunt 390 instead of empty conduit 346. Also, conduit 372 interconnects hydraulic system case drain 374 to conduit portion 330*b*, rather than relief conduit 368. Further, hydraulic resolver circuit 320 includes a pair of check valves 381 and 383, instead of an implement valve. Furthermore, reservoir 318 is depicted outside of the modular boundary (shown dotted), compared to the configuration in FIGS. 1 and 2.

Figure 4:
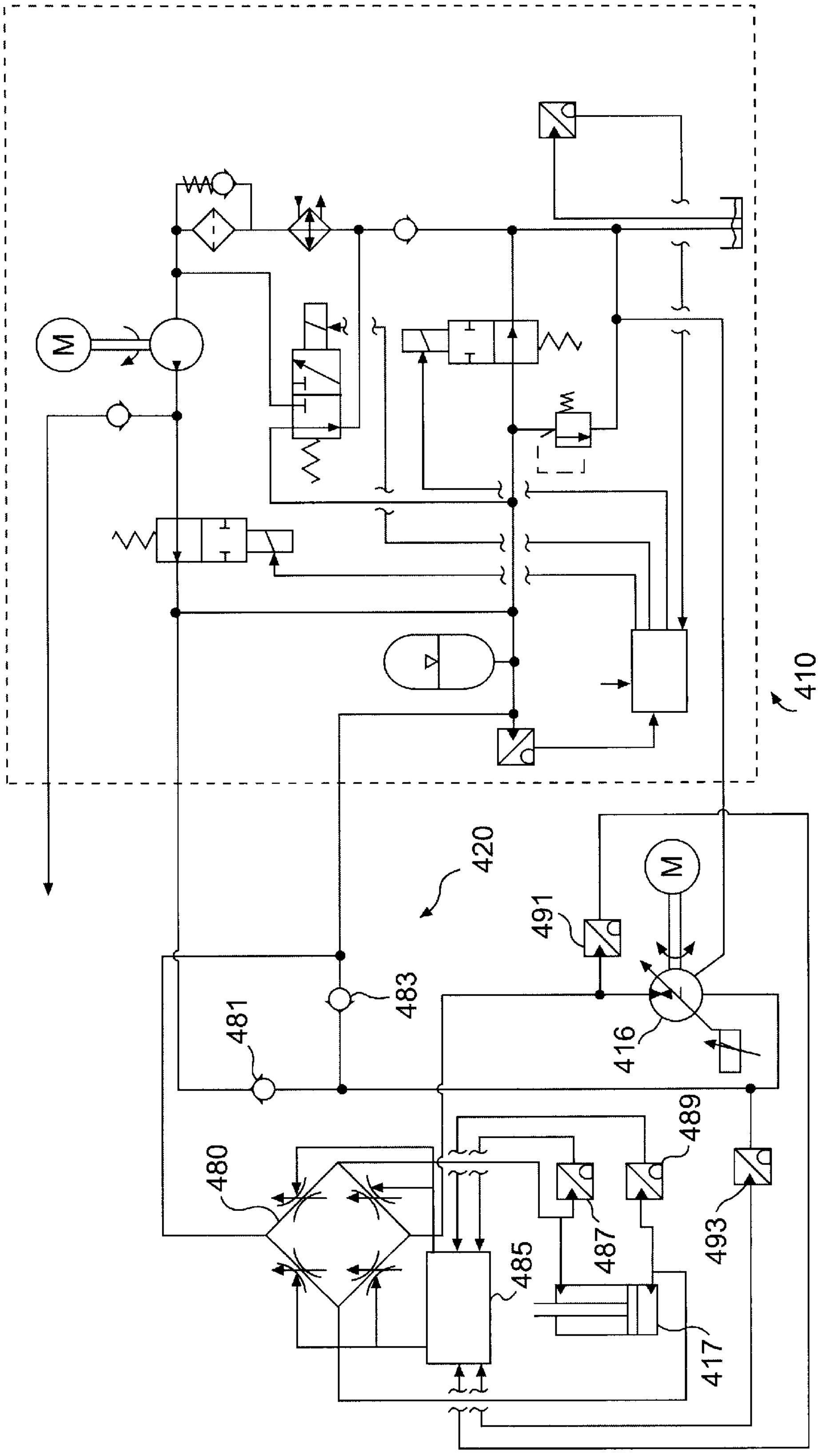
FIG. 4 is a schematic representation of a fourth exemplary embodiment of a pump charging and recirculation control apparatus shown in use with yet another implement drive system.

Yet another variation of a charging apparatus made in accordance with the present invention is shown in FIG. 4 and designated generally by the numeral 410. Similar components are given the same reference numbers as the FIG. 1 embodiment, but with a "400" base. Charging apparatus 410 is similar to that shown in the FIG. 2 embodiment. While usable with the hydraulic systems depicted in the embodiments of FIGS. 1–3, charging apparatus 410 is shown with yet another hydraulic system configuration, namely one having implement 417 controlled by resolver circuit 420 which includes check valves 481 and 483. Resolver circuit 420 also includes implement valve 480, which can be an electrically activated valve such as the four 2-way proportional valves configured in a bridge circuit as shown in FIG. 4. Implement valve 480 is controlled by hydraulic system controller 485 which receives implement pressure signals from sensors 487 and 489, as well as system drive pump 416 high/low pressure signals from sensors 491 and 493. Such programmable valve configurations could, of course, be used with other hydraulic systems including those depicted in the other embodiments.

Figure 5:
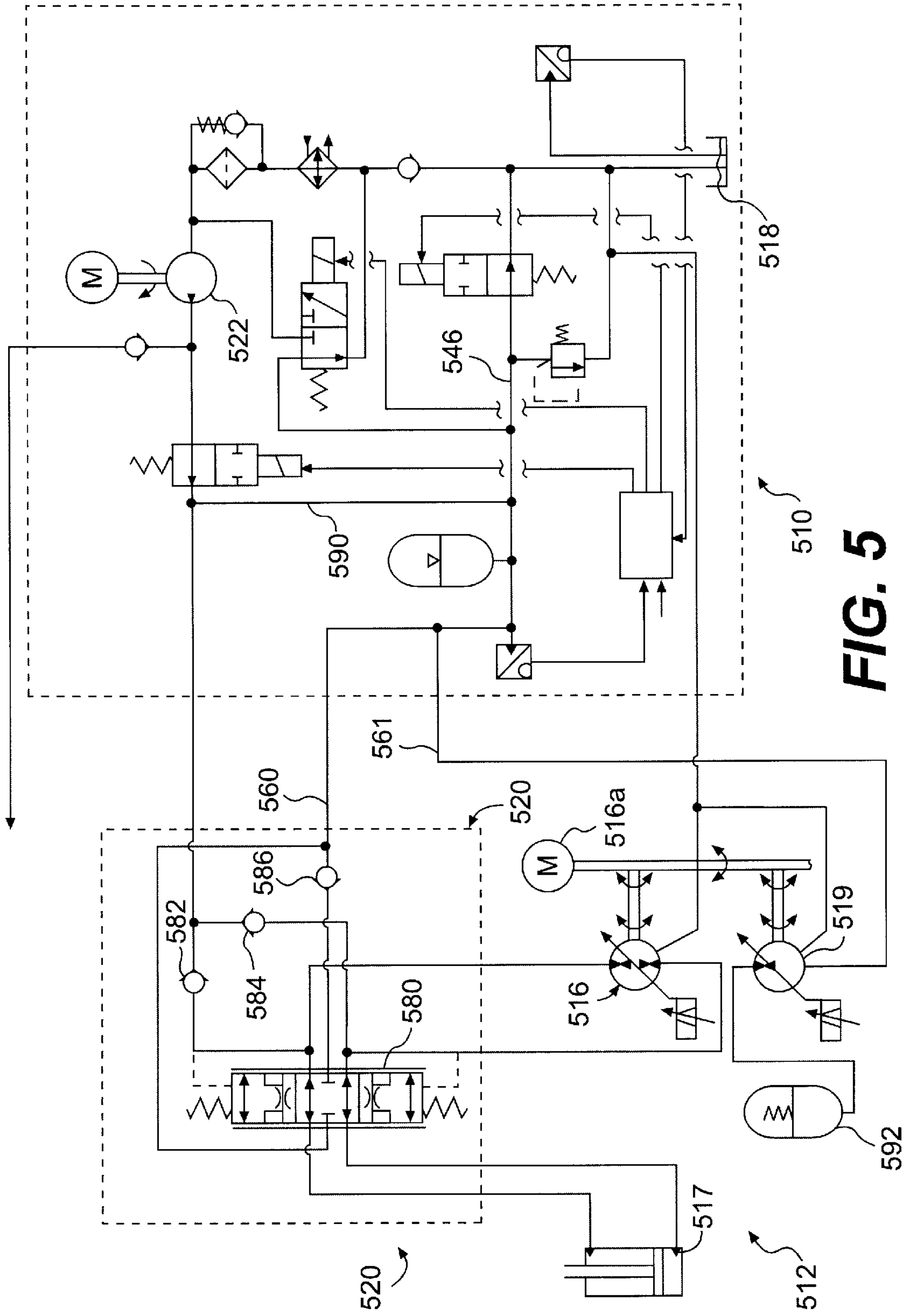
FIG. 5 is a schematic representation of a fifth exemplary embodiment of a pump charging and recirculation apparatus shown in use with still another implement drive system.

With reference now to FIG. 5, there is shown a further embodiment of the present invention, designated generally by the numeral 510, for charging recirculating fluid between a fluid reservoir, namely tank reservoir 518, and a hydraulic system, namely system 512. The configuration of charging and recirculation apparatus 510 is essentially that as depicted and described previously in relation to FIG. 2. Similar components are given the same reference numbers as the FIG. 1 embodiment, but with a "500" base. Moreover, the resolver circuit 520, which interconnects charging and recirculation apparatus 510 with hydraulic system 512 is essentially similar to that shown in FIG. 1, namely including resolver valve 580 and appropriate check valves 582, 584, and 586.

As depicted in FIG. 5, hydraulic system 512 includes at least one implement component 517 and also a pair of pumps, 516 and 519, both driven from motor 516*a*. Pumps 516 and 519 each have "over center" capability to recover energy from implements being deactivated. Optional high pressure accumulator energy storage is provided by accumulator 592 operatively connected to pump 519. The disclosed system including accumulator 592 can be used, for example, in situations such as "boom drops" where the energy available from the hydraulic fluid being forced back into the system could cause pump/motor overspeed. Also, pump 519 includes a single charging and return line, namely conduit 561 which is not controlled by resolver circuit 520. One skilled in the art would realize that pump 519 nonetheless would be provided charging pressure through conduit 561 from pump 522 acting through shunt 590, empty conduit 546, and system return 560.

Figure 6:
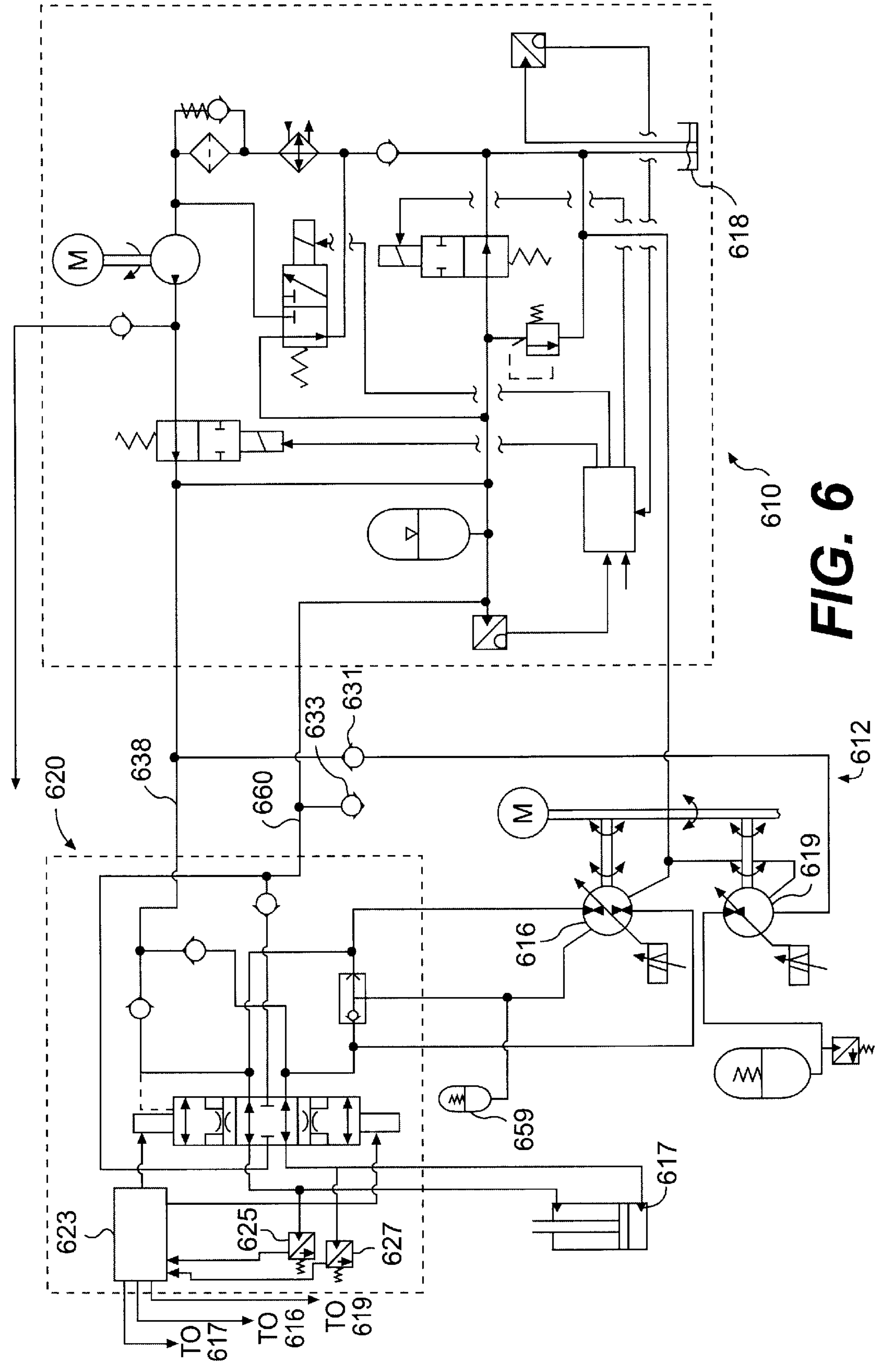
FIG. 6 is a schematic representation of the pump charging and recirculation apparatus of FIG. 4 shown in use with a variation of the hydraulic system of FIG. 5.

FIG. 6 depicts yet another exemplary embodiment of a charging and recirculation apparatus designating generally as 610, which is essentially the same as apparatus 210 and 410 depicted in FIGS. 2 and 4, respectively. Similar components are given the same reference numbers as the FIG. 1 embodiment, but with a "600" base. Also, apparatus 610 is shown in use for charging and providing recirculation between hydraulic system 612, which is essentially similar to the hydraulic system 512 depicted in FIG. 5, and tank reservoir 618 as mediated by resolver circuit 620. Although similar to the resolver circuit 520 shown in FIG. 5, resolver circuit 620 has been modified to provide optional accumulator 659 and electronic control over implement 617, system pump 616 which can be a 4-quadrant digital pump, and energy storage circuit pump 619 which can be a 2-quadrant digital pump. Specifically, resolver circuit 620 includes electronic controller 623 operatively connected to implement pressure sensors 625, 627, implement 617 and pumps 616 and 619. Check valves 631 and 633 ensure that discharge flow from pump 619 enters line 660 and inlet flow from pump 619 draws from line 638. This guarantees that inlet flow to pump 619 always includes some portion of the hydraulic fluid which has been filtered and cooled. Electronic controller 623 can be a suitably programmed microprocessor. One skilled in the art would be able to configure such a controller given the present disclosure. Moreover, some or all of the components of resolver circuit 620 could be included in a pump charging and recirculation apparatus module embodiment of apparatus 610. Such modular constructions could also be configured using the various resolver circuits and charging and recirculation apparatus disclosed in the previously discussed embodiments.

INDUSTRIAL APPLICABILITY

In operation, the disclosed apparatus can be used to control charging and recirculation between a fluid reservoir and a hydraulic system, particularly advantageously a hydraulic system having both hydrostatic drive components and implement components. Essentially, the disclosed apparatus, such as apparatus 10 shown in the FIG. 1 embodiment, uses a low-pressure accumulator (relative to the hydraulic system operating pressure), such as accumulator 58 together with electro-hydraulic fill and empty valves 44 and 48, respectively, to control charging pressure, rather than using a charge pump relief valve as is conventional. For example, at hydraulic system 12 start up, controller 62 would close both empty valve 48 and fill valve 44. Upon the charging pressure measured by pressure sensor 64 reaching a predetermined set point e.g. 1.4 MPa (~200 psi), controller 62 opens fill valve 44 to allow fluid to be circulated to the pump inlet 24 through fluid conditioning components 50 and 52. Alternatively, if it is not intended to cool and/or filter the fluid, controller 62 would select alternate valve outlet 54 to circulate the fluid through conduit 56 bypassing heat changer 50 and filter 52. Because of check valve 32, the pressure in the fluid path including conduit portion 30*a*, pump 22, conduit portion 36*b*, and bypass conduit 42 is approximately the charging pressure in the system, such that minimum pump energy is required to provide the circulation through pump 22.

If, during subsequent operation of system 12, pressure sensor 64 should sense a drop in pressure below the set point (or some lower set point to minimize cycling) such as by loss of system fluid through leakage or case drainage, controller 62 will close fill valve 44 allowing pump 22 to again charge accumulator 58 and hydraulic system 12 to the desired charging pressure.

As stated previously, accumulator 58 is sized to accommodate fluctuations in the fluid working volume of hydraulic system 12, such as would occur due to cylinder head/rod volume differences. However, the required fluid return from the hydraulic system upon retraction of a cylinder could exceed the working capacity of accumulator 58. In one embodiment of the present invention, as depicted in FIG. 1, this high returned volume is sensed as an increase in accumulator 58 pressure beyond a second predetermined set point, and controller 62 opens empty valve 48 to recirculate excess fluid to tank reservoir 18 until the accumulator pressure drops below the second set point (or a lower set point) whereupon empty valve 48 is closed by controller 62. The present invention, therefore, can reduce the fluid volume actually recirculated to tank reservoir 18 to that which is in excess of the current need of the overall hydraulic system 12, minimizing the amount of fluid having to be recharged to the system from tank to reservoir pressure and the power expended to accomplish this task.

During normal operation of hydraulic system 12 and charging apparatus 10, fill valve 44 and empty valve 48 under the control of controller 62 can be used to periodically adjust the accumulator pressure level which may have changed due to either the position of inactive implement cylinders or case drainage. Low pressure relief valve 70 would act only to prevent abnormal pressure build up in accumulator 58. One skilled in the art would further appreciate that charging and circulation pump 22 can serve several other purposes. It can circulate flow through filter 52 and heat exchanger 50, and it can provide an optional source of pressurized fluid for pilot pressure or to charge auxiliary equipment such as a brake accumulator, etc. via an auxiliary connection such as conduit 76 including check valve 78 as shown in the FIG. 1 embodiment.

The disclosed charging apparatus and method of operation can optionally provide one or more advantages over conventional hydraulic system charging apparatus and methods. Specifically, it can optionally allow system integration between implement drive systems and hydrostatic drive systems, possibly resulting in the elimination of redundant components or downsizing of existing components. It can optionally reduce pump cavitation problems and also provide the use of potentially higher implement pump speeds and potentially smaller, and thus less expensive, pumps. The apparatus and the methods of the present invention also can optionally reduce or eliminate implement cylinder voiding problems, particularly as compared to conventional systems that use only a relief valve to control fluid recirculated to the fluid reservoir. Still further, the apparatus and methods of the present invention can, in certain applications, optionally reduce or even eliminate a major hydraulic fluid contamination problem, namely the reservoir tank breather as a consequence of the reduction in the number of cycles, and fluid volume of each cycle, of the fluid recirculated to and recharged from the tank reservoir.

Moreover, the disclosed charging apparatus can allow implement and hydrostatic drive systems to be integrated; that is, the respective systems can be configured such that the hydrostatic drive pump and implement pump augment each other under certain situations. For example, the hydrostatic drive pump could be used to power the implements as well as drivetrain in some applications, and/or the implement pump could be used to power the hydrostatic drive motor, or help to power it.

Other aspects and features of the present invention can be obtained from a study of the drawings, the disclosure, and the appended claims.

What is claimed is:

1. Apparatus for charging fluid from a fluid reservoir, the apparatus comprising:

- a charge pump having an inlet and an outlet;
- a first conduit fluidly connected to the charge pump inlet and configured to be fluidly connected to the fluid reservoir;
- a second conduit fluidly connected to the pump outlet and configured to be fluidly connected to the system;
- an accumulator fluidly connected to the second conduit;
- a third conduit fluidly connected between the first conduit and the second conduit;
- an electrically actuated fill valve operatively disposed in said third conduit; and
- a hydraulic system having a drive pump configured to be charged with the fluid.

2. The apparatus as in claim 1 further including a fourth conduit fluidly connected to said second conduit and in fluid communication with the fluid reservoir, and an electrically actuated empty valve operatively disposed in said fourth conduit.

3. The apparatus as in claim 2 further including a pressure sensor associated with said accumulator, and a controller responsive to said pressure sensor and operatively connected to said fill valve and said empty valve.

4. The apparatus as in claim 1 further including a check valve operatively disposed in said first conduit to prohibit return flow to the fluid reservoir, the interconnection of the third conduit to the first conduit being between the check valve and the pump inlet.

5. The apparatus as in claim 1 further including an electrically actuated charge valve operatively disposed in said second fluid conduit between the pump outlet and a connection to the hydraulic system.

6. The apparatus as in claim 1 further including at least one component selected from the group consisting of a heat exchanger and a filter, said component being operatively connected to the first or second conduit, and wherein the interconnection of said component to the second conduit is at a location at or downstream of a connection between the second conduit and the system, relative to the charge pump.

7. The apparatus as in claim 6 wherein said one component is disposed in the portion of said first conduit downstream of the interconnection between the third conduit and the first conduit, said fill valve has a selectable alternative outlet, the apparatus further including a conduit interconnecting said alternative outlet and said pump inlet and bypassing said one component.

8. The apparatus as in claim 1, wherein the apparatus is configured as a charging module.

9. A hydraulic system charging and recirculation module including the charging and recirculation apparatus as in claim 1 and further including a resolver circuit operatively connected to the charging and recirculation apparatus and configured for connection to the hydraulic system.

10. Apparatus for charging and recirculating fluid between a hydraulic system and a fluid reservoir comprising:

- a supply conduit having a system end connectable to the system and a reservoir end connectable to the reservoir;
- a pump operatively disposed in the conduit between the system and reservoir ends;
- a check valve operatively disposed in the conduit between the pump and the reservoir end to prohibit return flow to the reservoir;
- an accumulator fluidly connected to the supply conduit between the pump and the system end;
- a first bypass circuit including a first bypass conduit having respective ends fluidly connected to the supply conduit at a location between the pump and the system end and at a location between the pump and the check valve, and including a first electrically actuated valve operatively disposed in the first bypass conduit; and
- a second bypass circuit including a second bypass conduit having respective ends fluidly connected to the supply conduit at a location between the pump and the system end and at a location between the check valve and the reservoir end, and including a second electrically actuated valve operatively disposed in the second bypass conduit.

11. The apparatus as in claim 10 further including a controller responsive to a signal indicative of a pressure of fluid in the supply conduit at the supply conduit end operatively connected to said first and second bypass valves.

12. The apparatus as in claim 10 further including a third electrically actuated valve operatively disposed in the supply conduit between the pump and the respective first and second bypass conduit connections to the supply conduit between the pump and the supply conduit end.

13. The apparatus as in claim 10 further including at least one fluid conditioning component selected from the group consisting of heat exchangers and filter assemblies operatively connected to the supply conduit.

14. A hydraulic system charging and recirculation module including the charging and recirculation apparatus as in claim 10 and further including a resolver circuit operatively connected to the charging and recirculation apparatus and configured for connection to the hydraulic system.

15. Apparatus for charging and recirculating fluid between a hydraulic system and a fluid reservoir, the apparatus comprising:

a conduit connectable between the system and the reservoir;

a pump operatively disposed in the conduit, the pump having upstream and downstream directions relative to the flow therethrough;

an accumulator fluidly connected to the conduit downstream of the pump;

means including selectively actuatable means for controlling the fluid pressure in the conduit downstream of the pump;

means including selectively actuatable means for controlling the return of fluid from the hydraulic system to the reservoir, said return control means being responsive to a pressure in the conduit downstream of the pump.

16. The apparatus as in claim 15 wherein the pressure control means includes a check valve disposed in the conduit upstream of the pump.

17. The apparatus as in claim 15 wherein the pressure control means and the return control means each includes an electrically actuated valve, and further including a controller operatively connected to the electrically actuated valves.

18. The apparatus as in claim 15 wherein the pressure control means further includes a charging valve disposed in the conduit downstream of the pump.

19. Method for charging and recirculating fluid between a hydraulic system and a fluid reservoir, the method comprising:

providing a system charging circuit including a pump with an inlet connected to the reservoir and an outlet connected to the system, and also an accumulator operatively connected to the pump outlet;

activating the pump to increase fluid pressure at the pump outlet and charge fluid to the system;

selectively feeding back fluid from the circuit to the pump inlet when a pressure in the accumulator exceeds a first predetermined value; and selectively returning fluid from the charging circuit to the reservoir when a pressure in the accumulator exceeds a second predetermined value.

20. The method as in claim 19 wherein the connection from the reservoir to the pump inlet includes a circuit portion having a pressure substantially greater than a pressure at the reservoir, and wherein the feeding back step includes the step of feeding back the fluid to said circuit portion.

* * * * *